United States Patent [19]

Scammell

[11] 4,065,732
[45] Dec. 27, 1977

[54] ENERGY RESONATING SYSTEM WITH ELIMINATION OF OPTICAL BENCH STRUCTURE

[75] Inventor: Frank H. Scammell, Concord, Mass.

[73] Assignee: Avco Everett Research Laboratory, Inc., Everett, Mass.

[21] Appl. No.: 709,843

[22] Filed: July 29, 1976

[51] Int. Cl.$^2$ .............................................. H01S 3/081
[52] U.S. Cl. .................................. 331/94.5 C; 350/299
[58] Field of Search ..................... 331/94.5 C, 94.5 D; 356/112; 350/299

[56] References Cited

U.S. PATENT DOCUMENTS

| 3,482,186 | 12/1969 | Chernoch | 331/94.5 C |
| 3,611,181 | 10/1971 | Lary et al. | 331/94.5 C |

Primary Examiner—William L. Sikes
Attorney, Agent, or Firm—Charles M. Hogan; Melvin E. Frederick

[57] ABSTRACT

A laser comprises an optical resonant cavity construction utilizing opposing corner cube and W-fold mirrors to provide a four-pass folded optical path which is not dependent upon critical alignment between the said mirrors and therefore eliminates necessity for rigid optical bench structure therebetween.

9 Claims, 7 Drawing Figures

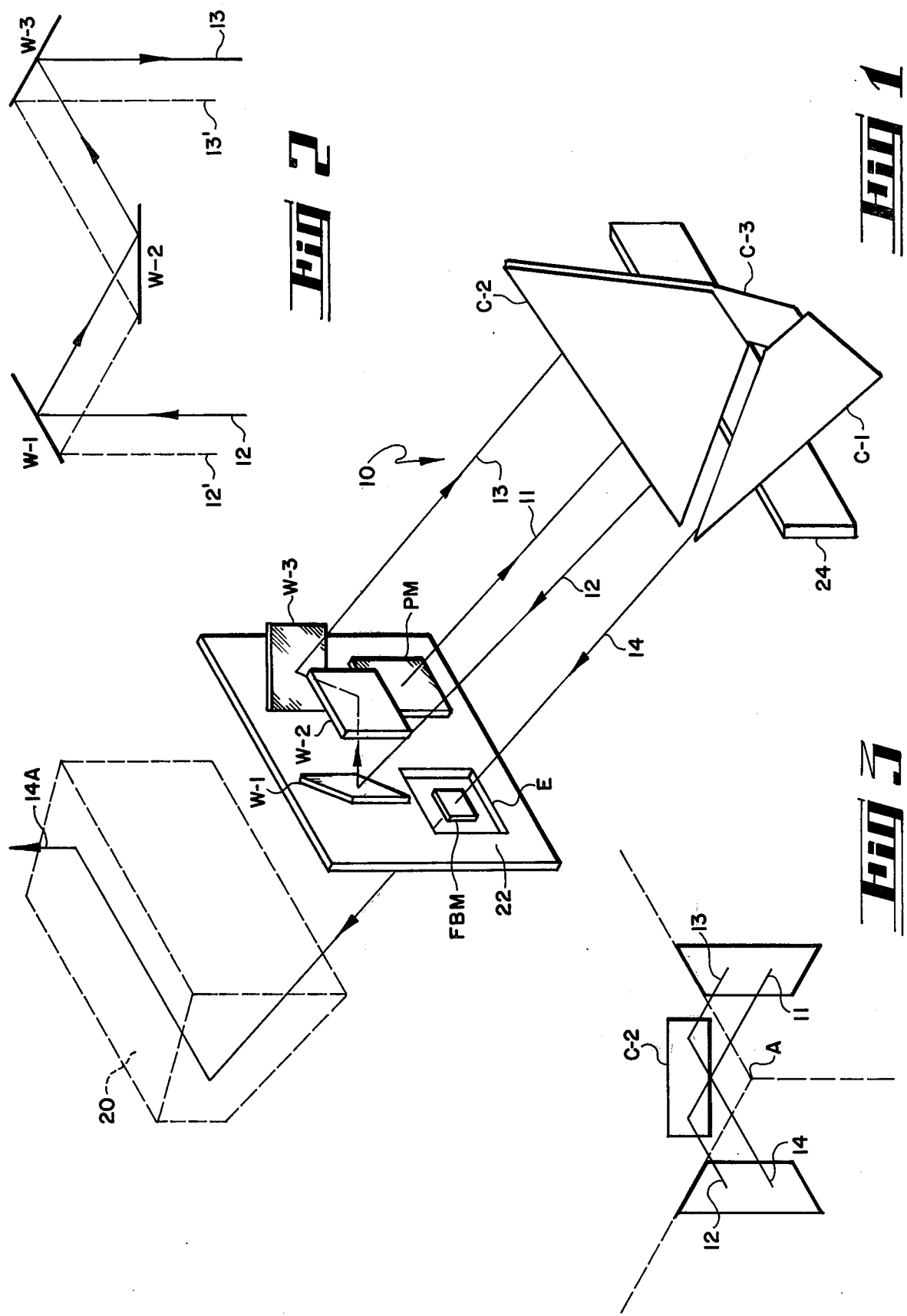

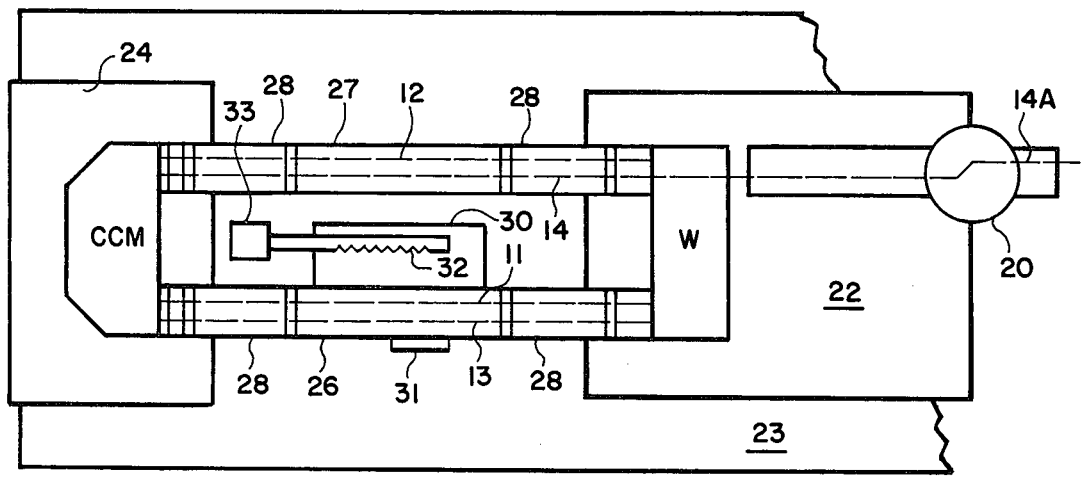
Fig 4
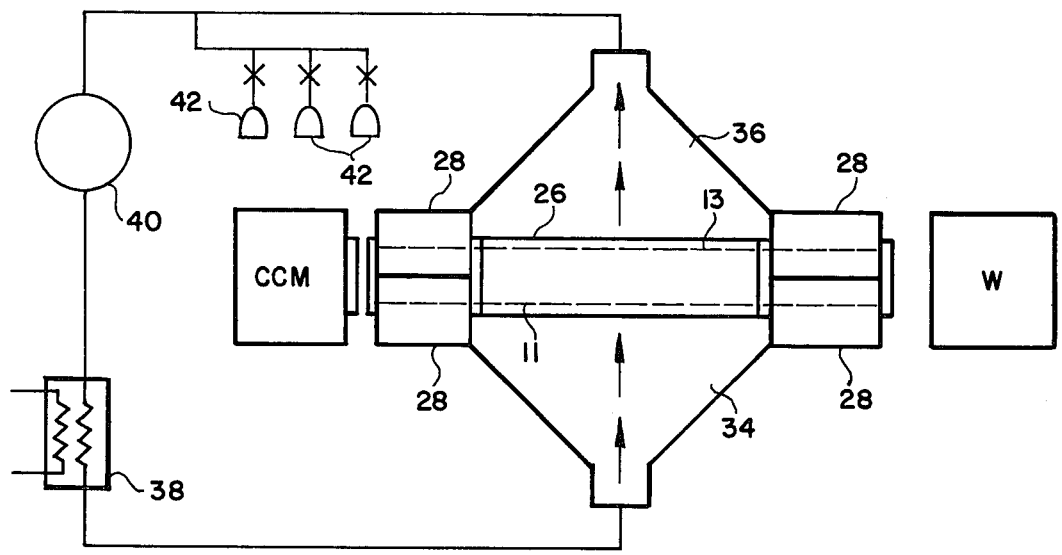
Fig 5
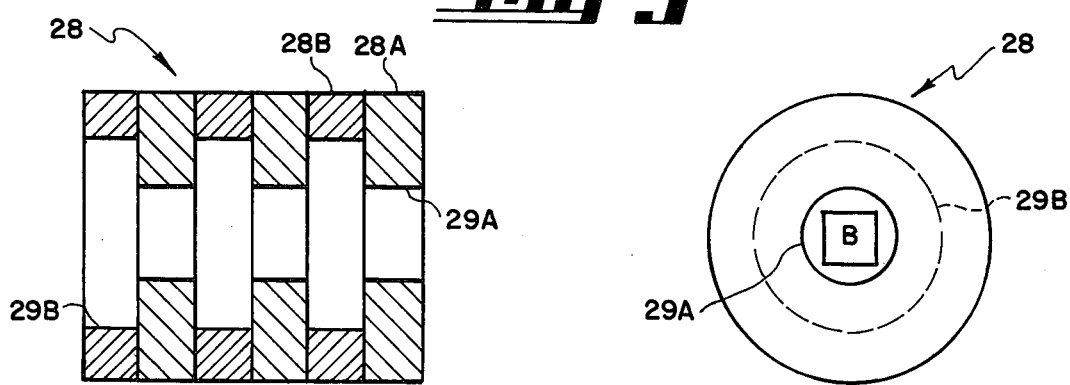
Fig 7
Fig 6

ENERGY RESONATING SYSTEM WITH ELIMINATION OF OPTICAL BENCH STRUCTURE

BACKGROUND OF THE INVENTION

The present invention relates to energy resonators and more particularly to resonant cavity structures for lasers, especially high power gas lasers of the type utilizable for drilling, welding, cutting, fusing and other heating, and also for communications and the like, the invention being particularly characterized by reduced weight and volume compared to prior art devices of the same class(es).

It is well known in laser design to provide an optical bench structure which rigidly interconnects the mirrors at opposite ends of a resonant cavity of the laser to prevent or accommodate misalignment between the mirrors since even with very small misalignments, the emerging light beam of the laser can be severely affected. The causes of such misalignment may comprise one or more of strains in the cavity defining structure due to large thermal gradients along its length, external mechanical loading and vibrations, e.g., when the laser is mounted on a vehicle. The prior art has utilized massive optical bench structures to prevent relative movement between the laser cavity and the mirrors. Damping isolation has also been utilized. In addition, folded optical paths defining the optical cavity of the laser resonator have been used so that the ends thereof are not thermally isolated, but rather are in a common thermal region to avoid substantial gradients.

Reference is made to U.S. Pat. Nos. 3,713,030 granted Jan. 23, 1973; 3,702,973 granted Nov. 14, 1973; 3,808,553 granted Apr. 30, 1974; 3,817,606 granted June 18, 1974; 3,851,273 granted Nov. 26, 1974; 3,861,707 granted Jan. 21, 1975; and 3,926,510 granted Dec. 16, 1975, all assigned to the same assignee as in this application and which are incorporated herein by reference as though set out at length herein.

It is an important object of the invention to reduce the optical bench weight in energy resonating systems.

It is a further object of the invention to provide low volume in resonant cavities for high power levels consistent with the preceding object.

It is a further object of the invention to provide energy beam stability consistent with one or both of the preceding objects.

It is a further object of the invention to provide simple, economic structures consistent with one or more of the preceding objects.

It is a further object of the invention to accommodate vibration conditions of state and vehicle mounted energy resonator applications consistent with one or more of the preceding objects.

SUMMARY OF THE INVENTION

In accordance with the invention, a resonant cavity structure comprises a resonant cavity space with primary and feedback mirrors and the space is further bracketed by a W-fold mirror assembly (including multi-bounce mirror assemblages producing actual e.g., complete or equivalent U-, V-, M- paths or approximate W-form paths, opposing a corner cube mirror assembly to provide a stabilized beam without the requirement for an optical bench spanning the cavity region between such mirror assemblies. Light or other energy travels a four pass or greater folded optical path defined by said assemblies and emerges from the cavity via an exit window. The corner cube mirror assembly has the characteristic that a rotational displacement of the corner cube causes no change in direction or displacement of the folded path beam acted on by the mirror assembly. Displacement of the apex of the corner cube causes a displacement shift but no rotations of the beam path. But the W-fold mirror assembly acting in cooperation with the corner cube mirror assembly restores an initially displaced beam (through displacement of the apex of the corner cube) to its reference position. Preferably, the resonant cavity space is subdivided into multiple cavities all of which may contain gain media alternatively and preferably at least one cavity may contain gain media and at least one cavity space is inert and does not contribute or subtract energy apart from essentially avoiding spoilage of the resonant condition. Preferably, the cavities are filled with gas media rather than solid state media or vacuums. The optical gain medium may be a lasing gas in which lasing action is induced by, for example, electric field, electron beam and/or gas dynamic pumping. The optical bench interconnection between the W-fold and corner cube mirror assemblies is eliminated and this elimination can save several hundred to several thousand pounds in connection with high power laser units and other forms of energy resonators. Acoustic resonators and radar resonators are among other applications of the invention.

In accordance with the invention, provision is made for mufflers and windows at the cavity interfaces, to control reflections of acoustic waves generated by a laser pulse and to prevent penetration of laser gas into the corner cube mirror assembly, preserving medium homogeneity consistently throughout and controlling absorption, heating and thermal blooming. A gas system of helium-nitrogen-argon may be used in the corner cube assembly and other optical regions which are not part of the resonant cavity space and maintained at a higher pressure than the gas in the resonant cavity space. Such gas matches the index of refraction of the cavity gas (helium-nitrogen-carbon monoxide-carbon dioxide) mixture. The cavity gas is essentially recirculated in a closed loop system and cooled in the course of recirculation. The W-fold and corner cube mirrors are also cooled.

Other objects, features and advantages of the invention will be apparent from the following detailed disclosure of preferred embodiments taken in connection with the accompanying drawings in which:

BRIEF DESCRIPTION OF THE DRAWINGS

FIG. 1 is a diagrammatic sketch of the opposing assembly of W-fold and corner cube mirrors in accordance with a preferred embodiment of the invention;

FIGS. 2 and 3 are diagrams of the optical reflections provided by the W and corner cube mirrors respectively;

FIGS. 4 and 5 are top and side views of an arrangement of an optical resonating system for a gas laser, and showing a portion of the laser beam production and utilization apparatus; and FIGS. 6 and 7 are longitudinal sections and an unsectioned end view of a muffler component of the apparatus.

DETAILED DESCRIPTION OF PREFERRED EMBODIMENTS

Referring now to FIGS. 1–3, the apparatus is explained by first visualizing the folded, four pass optical path within a resonant cavity space 10 indicated by axes of optical path movement, 11, 12, 13 and 14 with the emergent beam 14 extending into a bent beam 14A as determined by beam pointing and tracking structure. The apparatus in which such a beam is resonated comprises two cavity sections, a first one 26 (See FIG. 4) containing the beams 12 and 14 and a second one 27 containing the beams 11 and 13.

The primary and feedback mirrors of the resonator 10 are indicated at PM and FBM respectively. An exit window E surrounds FBM. Beam bending mirror means 20 bends emergent collimated beam 14 into a collimated working beam 14A.

FIGS. 1–2 show the arrangement of component mirrors W-1, W-2, W-3 of the W-fold mirror assembly to produce transverse shifts as shown for example by the intended ray 12 and its displaced position 12' shifted to a correspondingly displaced path 13' with respect to the intended ray 13, in a reversed image arrangement.

FIGS. 1 and 3 show the mirrors C-1, C-2, C-3 comprising the corner cube mirror assembly with the apex thereof indicated at A in FIG. 3. The FIG. 3 back view shows the six-bounce reflection at the mirrors which produces, in cooperation with the W-fold mirror assembly the four pass folded optical path having the self-corresponding properties described above.

The mirrors PM and FBM and W-1, W-2, W-3 are all supported from a common supporting structure indicated at 22 and rigidly coupled thereto and the mirrors C-1, C-2, C-3 are all supported from a common supporting structure indicated at 24 and rigidly coupled thereto.

Movement of the beams 12 and 13 in response to apex displacement is twice the magnitude of apex displacement and accordingly mirrors C-1, C-2 and C-3 are designed oversize to the extent of two times design tolerance for apex displacement.

Referring now to FIGS. 4–5, the two cavities of the optical system are indicated at 26 and 27, the W-fold mirror assembly at W, the corner cube mirror assembly at CCM, the beam rotator at 20 and the above mentioned housings at 22 and 24. Also shown are mufflers 28 in line with the beams 11–14 to damp out acoustic waves.

An electron gun assembly 30 containing an electron source filament 32 with a power supply 33 and other electron energy and distribution defining electrodes (not shown) provides radiant energy excitation of a lasing gas medium in cavity 26 to induce photon emission therein leading to light amplification by reflection between the mirror assemblies. An accelerator electrode for the electrons is indicated at 31. Detailed implementation of the structural elements 30–33 is made in accordance with the teachings of the above referenced U.S. Pat. No. 3,702,973 and may include the utilization, all as shown in said patent, of means for establishing a sustainer electric field for ionization discharge conditions in the lasing medium in cavity 26 so as to generate a secondary electron emission therein which is now compared to ionization generated by free electrons passing through a gas impervious, radiation permeable barrier from the evacuated electron gun to the lasing gas filled cavity; related electrical power supplies and controls; and gas species and pressure selection and controls. Consistent with the present invention, the electron filament 32 may be replaced by other discharge establishing means as indicated in U.S. Pat. No. 3,702,973.

A recirculating gas flow loop as shown in FIG. 5 includes cavity 26 comprising an inlet manifold 34, an outlet manifold 36, a heat exchanger 38, a fan 40 and make-up gas supply means 42. The lasing gas may, for example, comprise a mixture of $8He:5N_2:2Co:1CO_2$ (volumetric ratio). Portions of it may be bled off through walls of cavity 26 for boundary layer control in a manner which is per se well known in the art. Some of the gas may also be lost through mufflers 28 by overpressurizing it compared to the gas in the mirror assemblies to provide an aerodynamic window. Such losses are replenished by the make-up gas supply. The use of bleeding and make-up also counteracts poisoning of the gas.

Cavity 27 may be a dummy cavity or an active lasing cavity like 26 and may have a similar closed loop flow with make-up in either case. When operating as a dummy cavity, the gas content turnover is adjusted for a $CO_2$ laser to limit the concentration of absorbing $CO_2$ to keep the cavity isothermal. Cavity 27 may alternatively be serviced either as a dummy or active cavity by a parallel flow top around cavity 26 in the closed loop of FIG. 4 with similar inlet and outlet manifolds. The electron source structure may be outside the envelope of the two cavities 26, 27 or (preferably) therebetween as indicated in FIG. 4.

The end assemblies of mirrors and the beam utilizing apparatus 20 may be filled with pure nitrogen or other gases essentially matching the index of refraction of the lasing gas, or with a mixture identical to the lasing gas.

The mirrors C-1, C-2, C-3, W-1, W-2, W-3 are all plane mirrors, the mirror PM is convex and the exit window E has a plan form and may include the concave feedback mirror FBM as shown in FIG. 1 or disposed in a corner. The mirrors are preferably all made of low absorption coatings on metal substrates, the latter preferably being OFHC copper or the like cooled via internal passages constructed as shown in the above referenced U.S. Pat. No. 3,817,606. The low absorption coatings comprise five quarter-wavelength thick (with respect to the wavelength of the coherent light output of the laser, e.g., in the above preferred gas mixture, 10.6 microns) zinc sulfide layers alternating with five quarter-wavelengths layers of germanium all applied to highly polished substrate surface. The coolant flowing through the internal channeling of the mirrors is preferably water or other liquid.

The mirror dimensions may comprise, in a preferred embodiment, 4 cm by 4 cm square (planar projections of their faces) a separation of 15.86 cm between near edges of mirrors W-1 and W-3 and lengths of optical paths 11–14 aggregating 701.6 cm, radii of curvatures of 38.18 m for mirror PM and 24.15 (minus) m for mirror FBM. The feedback mirror FBM may be 0.4 cm square. The system produces an equivalent Fresnel number of Neg = 2.5 and a geometric output coupling ($L_c$) of 0.6. Each of the mirrors of the system, and the exit window, is supported at three corners by alignment supports (e.g., spherical surfaces clamped into hardened V-ways in a support bracket) capable of adjusting static position thereof to within ± 2.5 micron-radians and within ± 1 mm of the optic axis. Each such support has a heat shield facing the nearest cavity to minimize absorption of diffracted and scattered radiation.

The mounting structures 22 and 24 indicated schematically in FIg. 4 may comprise rigid skeletal or plate structures with the mirror assembly mounted thereto by conventional vibration isolators resonant in the vicinity of 20 Hertz to produce a maximum displacement of ± 1 mm. The supporting structures 22 and 24 are, in turn, mounted from a common structure 23 such as a vehicle, laboratory or factory floor, etc. The structure 22 may be mounted from 23 by a gimbal or other conventional multi-degree of freedom mounting and drive means (not shown) are provided to shift 22 (and thereby W) to compensate shifts in the optic axis caused by slow drift maneuver of a vehicle carrier or rotation of the earth, as detected by an auxiliary detector (not shown) which may be a small visible light laser beamed on a two-axis detector, the auxiliary laser and detector being mounted on the laser structure.

The muffler elements 28 are shown in FIGS. 6–7 and each comprises a stack of two to three inch acoustic absorbing discs 28A (made of foams or other fibrons produced per se for such purpose, e.g., Scott foam) with holes 29A of internal diameter subtending the beam cross-section (B in FIG. 6) alternating with similar discs 28B with holes 29B of internal diameter of about one and a half times the diameters of holes 29A. The outer diameters of discs 28A and 28B may be twice that of the diameters of internal hole 29A.

Such muffler usage, together with the confocal optical path arrangement of parallel cavities prevents acoustic wave resonance within the cavity and diffraction coupling, either of which could spoil intended energy distribution and mode within the beam.

It is evident that those skilled in the art, once given the benefit of the foregoing disclosure, may now make numerous other uses and modifications of, and departures from the specific embodiments described herein without departing from the inventive concepts. For instance, in addition to the modifications mentioned above, the W-fold/corner cube opposition arrangement could be multiplied through interposition of additional corner cube mirrors to create additional folds in the optical path, the W-fold mirror could be executed with the middle mirror (W-2) behind rather than ahead of side mirrors (W-1, W-3) as shown, other equivalents of the described mirror assemblies consistent with the objects of this invention could be made, and the lasing modes could be cw or pulsed and the equipment described could be used in MHD generators, accelerators and chemical reaction generation (e.g., ozone production) and the like with modifications obvious to those skilled in such arts. Consequently, the invention is to be construed as embracing each and every novel feature and novel combination of features present in, or possessed by, the apparatus and techniques herein disclosed and limited solely by the scope and spirit of the appended claims.

What is claimed is:

1. Energy resonating system comprising:
   means defining at least one cavity space with primary and feedback mirrors,
   means defining a pair of additional opposing mirror assemblies bracketing the cavity space, said primary and feedback mirrors and said mirror assemblies defining an optically resonant cavity,
   means for energizing the cavity space, and
   mounting means for said mirror assemblies constructed and arranged to allow relative freedom of movement therebetween,
   one of said mirror assemblies being a W-fold mirror assembly and the other a corner cube mirror assembly producing a folded confocal optical reflecting path between the primary and feedback mirrors and including the component mirrors of said W-fold and corner cube assemblies so that occasional relative displacement from an initial alignment between said opposing mirror assemblies is at least substantially compensated notwithstanding relative movement therebetween.

2. Resonating system in accordance with claim 1 wherein the mounting means comprise structure of a vehicle carrying the resonant cavity.

3. Resonating system in accordance with claim 1 wherein the means for energizing comprise means for producing gas lasing action therein,
   and further comprising, means for confining a flowing gaseous working medium in said cavity, and
   means for introducing free electrons into said gaseous working medium from outside the cavity and maintaining high density of free electrons, while maintaining density of secondary electrons in the medium sufficiently low relative thereto to maintain continuous lasing operation at high power levels.

4. Resonating system in accordance with claim 1 wherein said means defining said cavity space has a gas inlet for supplying a gaseous working medium to the interior of at least a portion of said cavity space and a gas outlet for exhausting said working medium supplied to said cavity space.

5. Resonating system in accordance with claim 1 and further comprising,
   means for limiting diffraction coupling between sections of the optical path, and
   means for limiting acoustic wave propagation along the optical path.

6. Resonating system in accordance with claim 1 wherein the resonant cavity space is subdivided into multiple essentially parallel cavities provided between said common W-fold mirror assembly and corner cube mirror assembly pair,
   the optical path between primary and feedback mirrors being folded and extending through said multiple cavities via said mirror assemblies.

7. Resonating system in accordance with claim 6 wherein at least one of said cavities comprises an active gas lasing cavity and at least one other cavity comprises a dummy cavity for transmission of a beam reflected by said mirror assemblies of energy apart from maintenance of the resonant condition.

8. Resonating system in accordance with claim 1 wherein the W-fold mirror comprises spaced mirror surfaces of rigidly interconnected materials defining a W-form optical reflecting path.

9. Resonating system in accordance with claim 8 wherein the W-fold mirror comprises spaced mirror surfaces of rigidly interconnected materials defining a W-form optical reflecting path and wherein primary and feedback mirrors are mounted essentially rigidly with the W-fold mirror assembly.

* * * * *